United States Patent [19]

Coe

[11] Patent Number: 4,887,179
[45] Date of Patent: Dec. 12, 1989

[54] SUBSTRATE FOR RIGID DISK STORAGE MEDIA AND METHOD AND APPARATUS FOR MAKING THE SAME

[75] Inventor: Thomas U. Coe, Saratoga, Calif.

[73] Assignees: Furukawa Aluminum Co., Ltd., Tokyo; Kawasaki Steel Corp., Kobe; Itoh & Co., Ltd., Osaka, all of Japan

[21] Appl. No.: 339,878

[22] Filed: Apr. 14, 1989

Related U.S. Application Data

[60] Continuation of Ser. No. 165,878, Mar. 9, 1988, abandoned, which is a division of Ser. No. 4,296, Jan. 2, 1987, which is a continuation of Ser. No. 628,177, Jul. 6, 1984, abandoned.

[51] Int. Cl.$^4$ ............................................. G11B 5/82
[52] U.S. Cl. .................................. 360/135; 29/34 R; 72/352; 428/579
[58] Field of Search ................. 360/97.01, 98.01, 133, 360/135; 29/34 R, 406, DIG. 18, DIG. 20; 72/39, 333, 352, 356, 329, 359; 428/579

[56] References Cited

U.S. PATENT DOCUMENTS 2,972,183 2/1961 Greenshields ................ 29/DIG. 18
3,886,052 5/1975 Smith .............................. 360/135 X
4,588,653 5/1986 Wray .............................. 360/135 X

OTHER PUBLICATIONS

IBMTDB, vol. 26, No. 3A, Aug. 1983, pp. 1208-1209; W. H. Bachman, "Magnetic Disk Container".

Primary Examiner—A. J. Heinz
Attorney, Agent, or Firm—Townsend & Townsend

[57] ABSTRACT

A substrate including a disk having a pair of opposed faces and being coined to provide a sub-micron flatness and smoothness for the disk faces. The coined disk can then be coated with a layer of storage material and used as a storage medium. Apparatus and a method for forming the coined substrate includes means for moving a plurality of disks along a predetermined path after the disks have been formed by blanking or stamping. The disks are cleaned before being coined and then stacked into containers which can be closed for transit to a point of use. The coining of the disks and the placement of the disks in containers is done under clean room conditions and the resulting coined substrates are free of flaws and defects encountered with the practice of conventional substrate forming techniques.

6 Claims, 7 Drawing Sheets

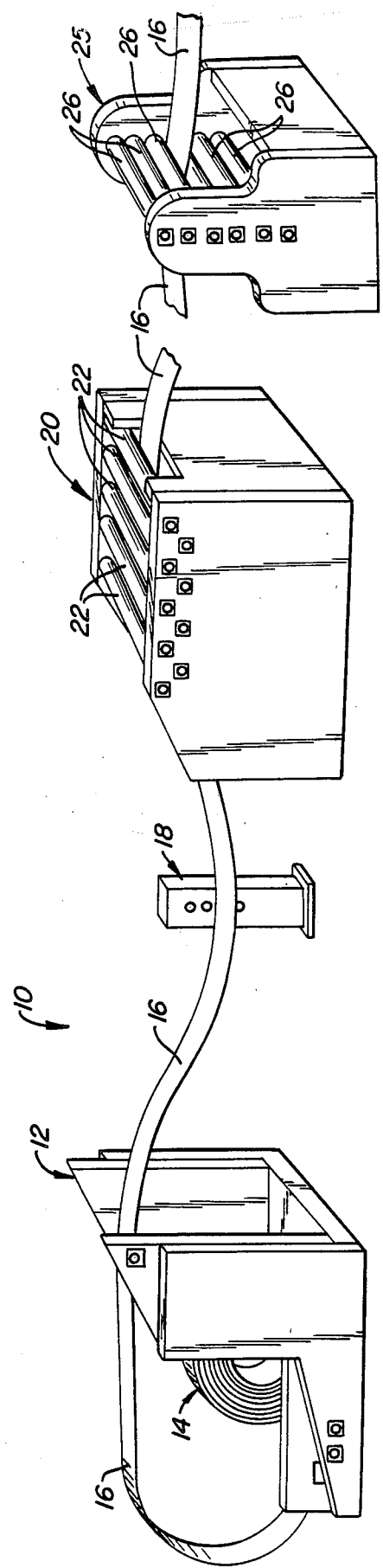
FIG.—1a.

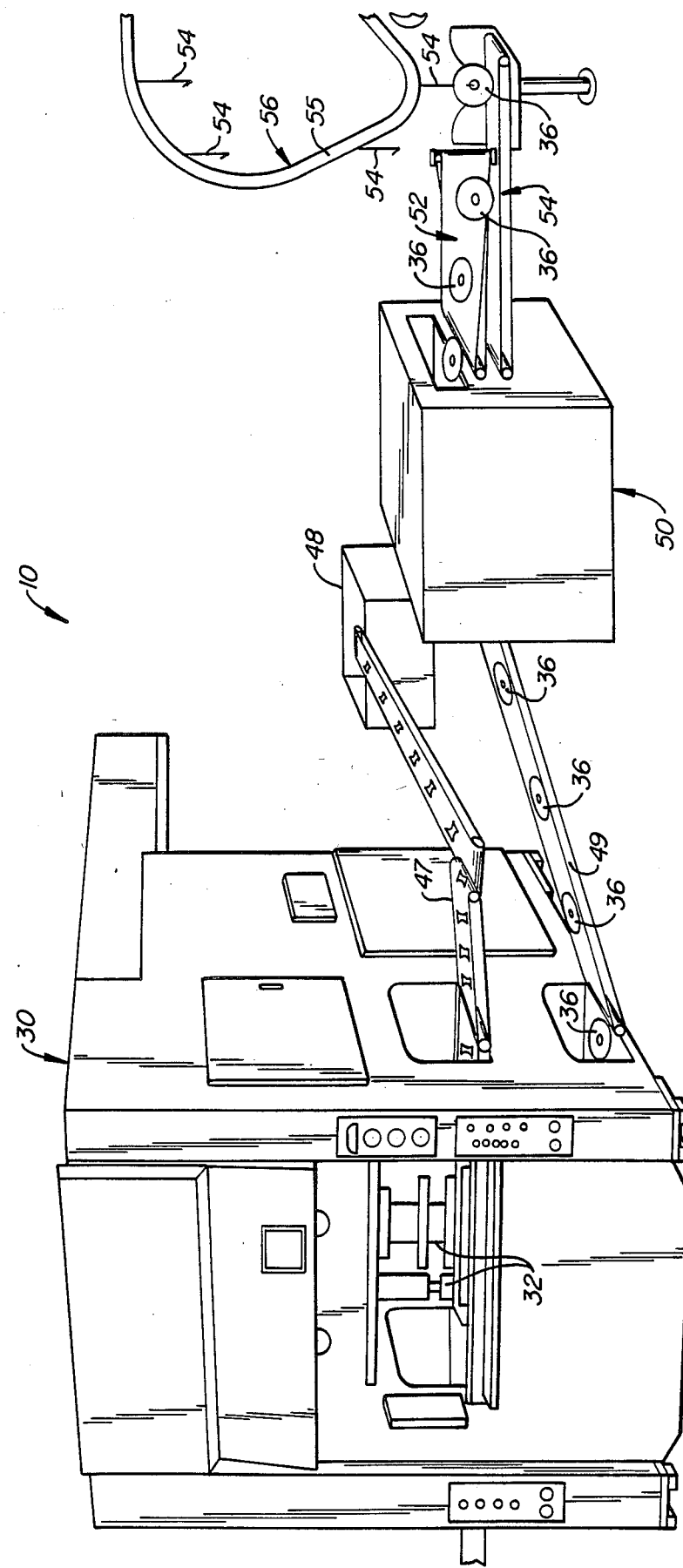
FIG.—1b.

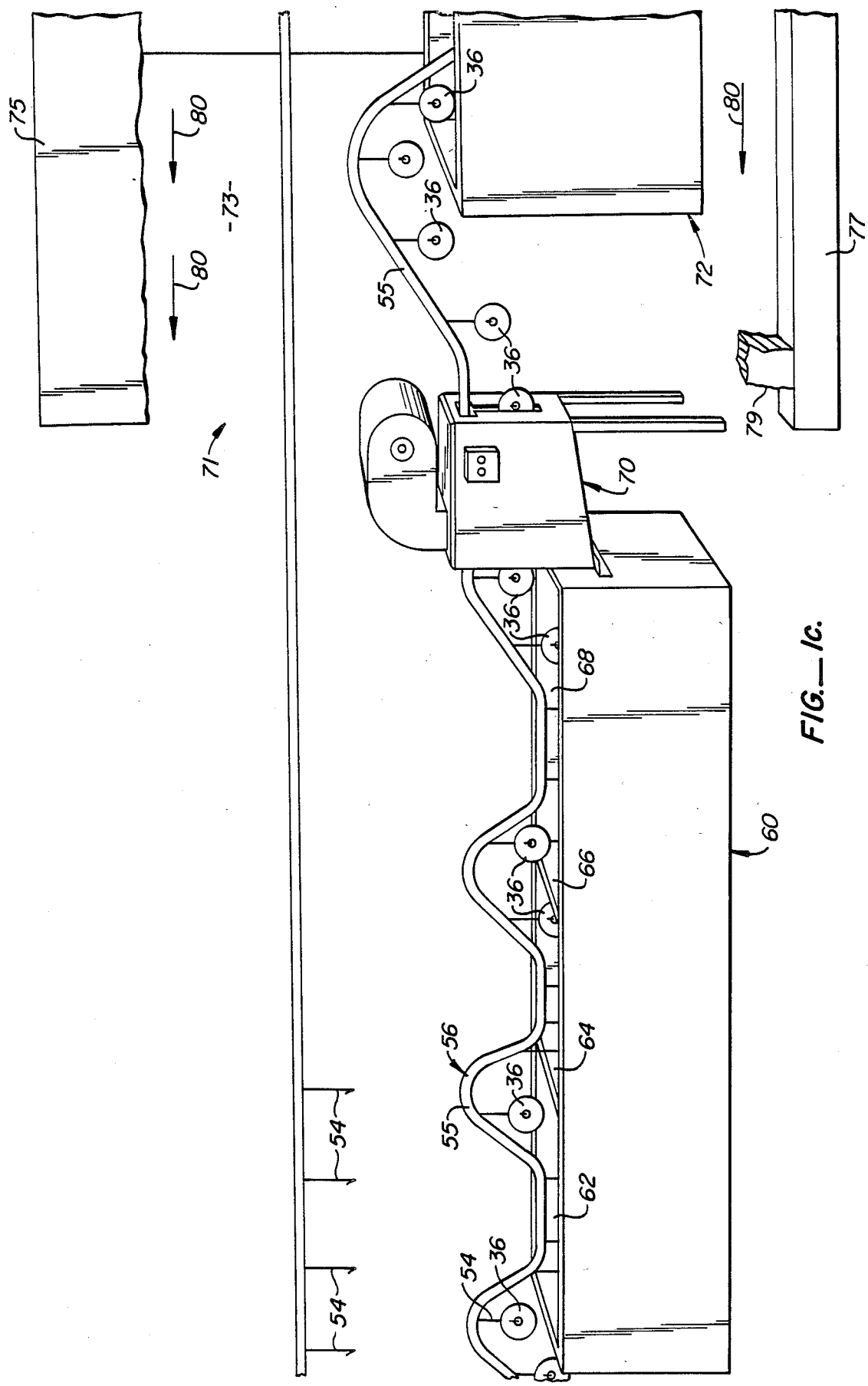
FIG.—1c.

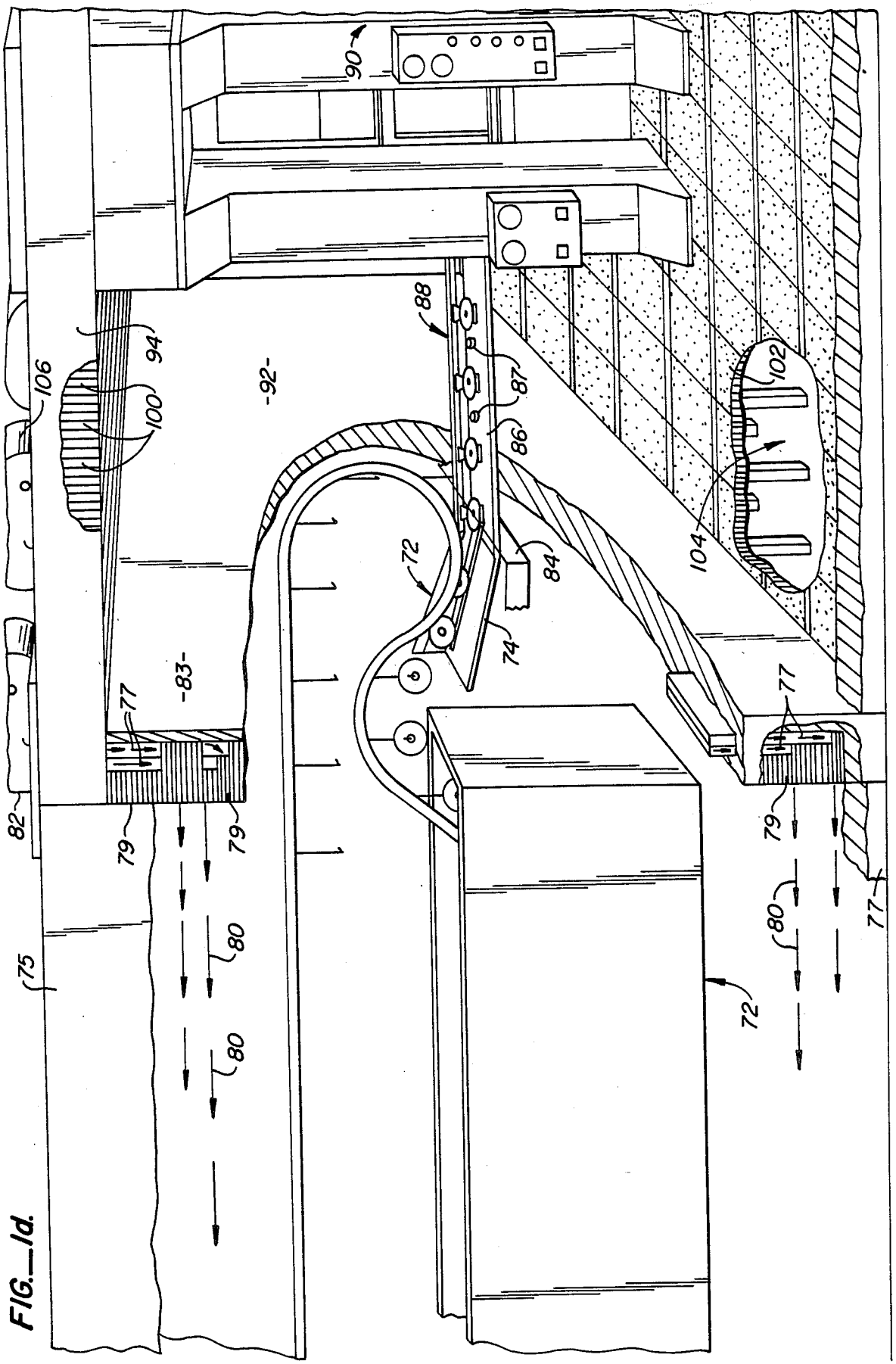
FIG._1d.

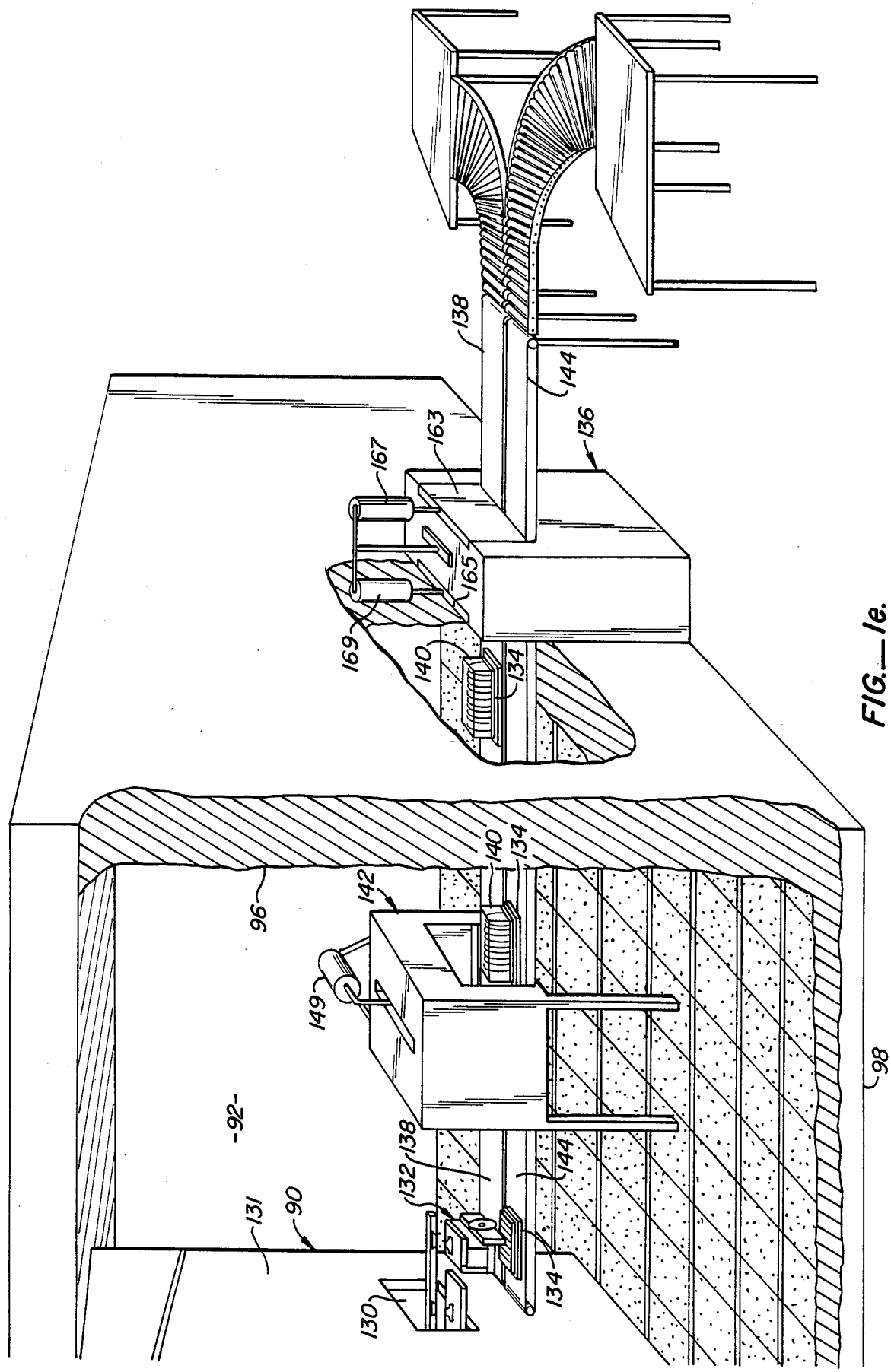
FIG._1e.

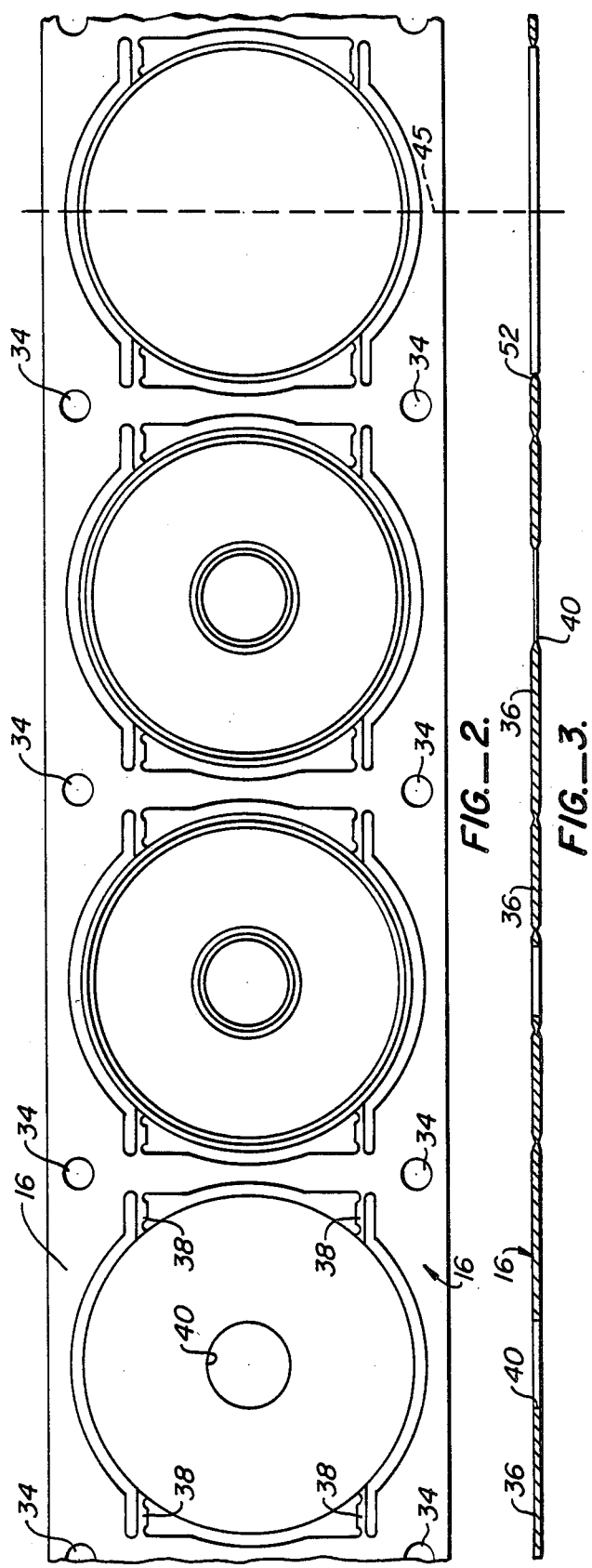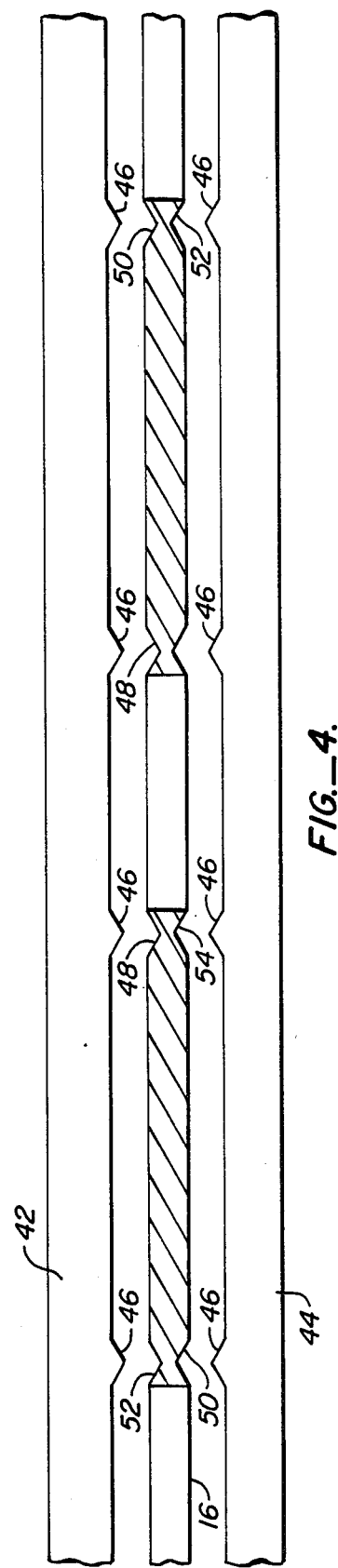

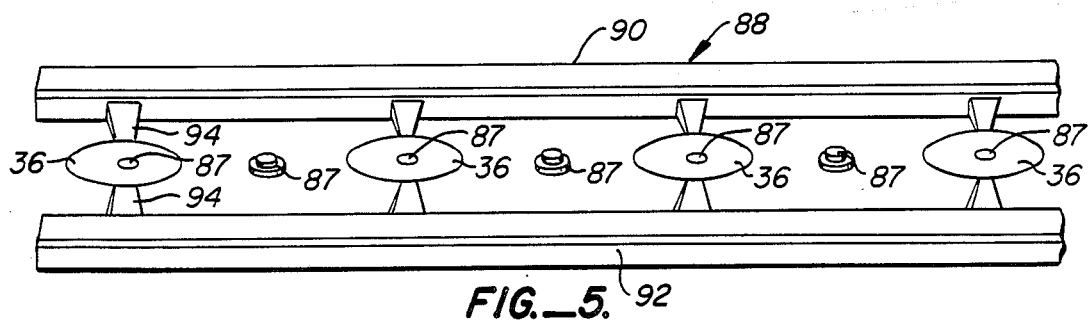
FIG._5.
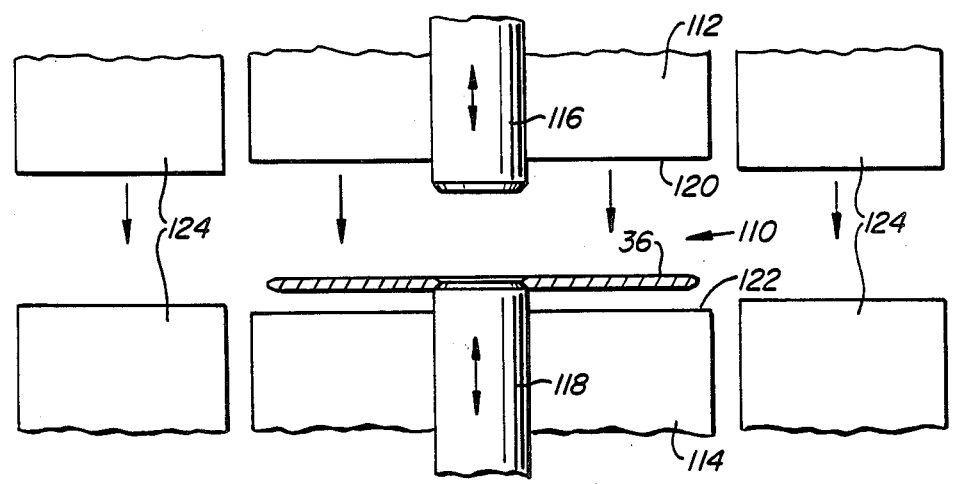
FIG._6.
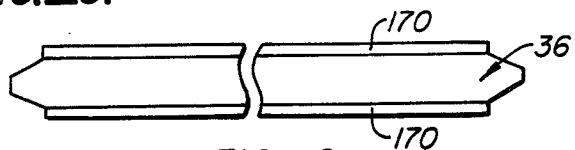
FIG._8.
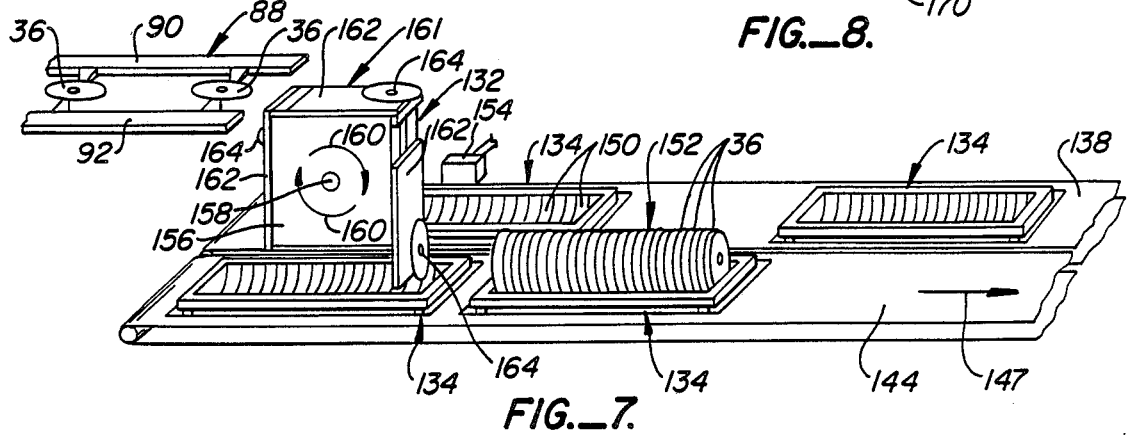
FIG._7.

SUBSTRATE FOR RIGID DISK STORAGE MEDIA AND METHOD AND APPARATUS FOR MAKING THE SAME

This is a continuation of Ser. No. 165,878 filed Mar. 9, 1988, abandoned, which was a division of application Ser. No. 4,296, filed Jan. 2, 1987, which was a continuation of Ser. No. 628,177 filed July 6, 1094 and now abandoned.

This invention relates to improvements in the method for forming a substrate for data storage media.

BACKGROUND OF THE INVENTION

The information processing industry is expanding at an extremely high rate as is well known. In fact, in the 1982 Annual Report of IBM, it is predicted that the information processing industry will exceed $1 trillion by 1990. In this prediction, computer-related hardware is forecast to be a $200 billion segment of the industry. Of this segment, the rigid disk drive portion is the single, largest element. It is further forecast that the rigid disk market will grow from an $11 billion business in 1983 to well over $40 billion dollars by 1990. This prediction recognizes a market for the rigid disk type of storage media which gives rise to the need for improvements in the manufacture of rigid disks in such a manner as to minimize production costs, increase production yields, and improve the quality of such storage media.

Conventional techniques of making rigid disk recording media leave much to be desired because of the inherent flaws and defects which remain in the media as the result of the manufacture techniques which are used. A rigid disk recording medium includes a rigid substrate over the faces of which a coating of storage material, such as magnetic or optical material, is placed. Unless the substrate is properly manufactured, these flaws or defects will arise inherently, and control in the manufacture of the substrates to eliminate the flaws and defects is a time consuming, high cost aspect of the overall manufacturing process.

To minimize the flaws in such conventional substrates, several different techniques have been adopted and used, none of which with any great success. Among these techniques is an abrasive machining technique in which an abrasive material is applied to the faces of a substrate to eliminate the flaws or defects on such faces. Another technique is the so-called lathe-turning or diamond-turning technique where each substrate is rotated about its central axis and subjected to the cutting technique of a diamond tipped tool to smooth the faces and to flatten the same while removing oxides and other coatings therefrom. Still a third technique is a electrochemical machining technique which subjects the faces of a rigid substrate to an electrochemical process to clean the faces and make them substantially flat and parallel with each other. The most popular technique adopted and used to date, however, is a combination of the three techniques mentioned above. However, none of the techniques used today are economical or provide a high yield output; thus, serious limitations exist in the manufacture of substrates for rigid disk recording media if it is desired to have a high quality product at minimum cost.

A typical procedure in the manufacture of a substrate for use as the base of a rigid disk recording medium includes the purchase of a disk blank with a roughed inner diameter and outer diameter. The blank is initially directed through a double disk grinder to cause the faces of the blank to become substantially flat and to remove the oxide layer on the faces of the blank. Then, the blank is directed through an edging and chamfer machine to bore the inner and outer peripheries to try to assure that the inner and outer diameters will be substantially within certain tolerances. The blank is then directed through a flat baking oven and subjected to 10 to 12 hours of this oven for annealing purposes. The blank is then put into a diamond-turning lathe, and the two faces of the blank are subjected to a reduction step by the diamond tool. After this has occurred, both faces of the blank must then be examined and inspected to assure that it contains no major flaws or defects and is within certain tolerances specified for the manufacture of a rigid disk recording medium. All the foregoing is extremely time consuming and costly and provides a limited yield at best, such as 100 to 125 blanks per hour. Moreover, not all of the flaws and defects associated with the blanks are clearly eliminated; thus, the quality of the resulting product for use as a substrate for a rigid disk recording medium is relatively low and rejections are common everyday occurrences. Flaws and defects found in conventional substrates are random and unpredictable. Their combined effect is to produce substrates as unique as fingerprints, traceable to the machinery and variables that are used to produce them. The mechanical integrity and strength of conventional substrates is questionable at all times and their reliability is relatively low over long periods of time.

Because of the foregoing problems associated with conventional disk media substrates, a need has existed and continues to exist for a high quality rigid disk media substrate for use in data storage technology, including those in the microcomputer and other markets, such as audio, video and laser disk recording, all of which require a substrate of high quality specifications and consistent quality. The present invention satisfies the need for such a substrate for a high quality rigid disk media substrate.

SUMMARY, DETAILED DESCRIPTION AND EXAMPLE OF THE INVENTION

The present invention is directed to an improved method for forming substrate for use as part of a rigid disk recording medium wherein the substrate is substantially free of all the flaws and defects of conventional rigid disk substrates yet the substrate according to the method of the present invention can be made at high production speeds and be of extremely high quality while assuring that the substrate will be consistent in geometry and reliability and will have high mechanical and structural integrity and strength. Moreover, the substrate according to the method of the present invention can be made so that the faces of the substrate can have any desired texture, lay or form so that the substrate will be suitable for a wide variety of applications notwithstanding its high quality and high structural and mechanical integrity. Additional features of substrates according to the method of the present invention is that they have uniform part-to-part dimensions and consistent geometry including uniformity of surface, parallelism of faces and flatness of such faces. Each substrate is symmetrical, pre-stressed, stronger and more dimensionally stable and with greater integrity than substrates which require machining from rough blanks.

Another aspect of the present invention is the provision of a method for mass production of the substrate of the type described. Such method allow for the high yield manufacture of the substrate in a single pass through a production line, beginning with the blanking or stamping of disks from an elongated strip of material, such as aluminum or aluminum alloy. The method further include cleaning and treating the blanks as they move toward and through an embossing or coining press in which each substrate disk or blank is subjected to a high pressure, such as 1500 tons or more, to cause a cold flow of the material on the faces and within the disks, resulting in a surface on each face of extremely high quality, free of flaws, consistent and uniform in dimensions and geometry and parallelism between the faces and flatness of each face, respectively. The method further includes means for packaging the coined disks in such a manner that the disks are kept free of contamination with the atmosphere, yet the disks can be immediately moved to a point of use or storage location depending upon needs for production of high quality rigid disk storage media using the coined substrates.

The primary object of the present invention is to provide a method for forming an improved substrate for use as a part of a rigid disk storage medium wherein the substrate is formed in a coining process to provide surfaces on the substrate which are uniform in dimension and consistent in geometry with other substrates, including uniformity in surface, parallelism of faces and flatness of each face of tee substrate, whereby the substrate is virtually free of flaws typically found in substrates produced by conventional diamond-turning and abrasive machining techniques yet the substrate according to the method of the present invention is of extremely high quality, can be made at high production rates at minimum cost.

Another object of the present invention is to provide an improved substrate of the type described wherein the substrate can be fabricated with any desired surface finish, texture, lay or form yet the substrate has high mechanical and structural integrity and strength and can be made at a rate many times greater than the rate at which conventional substrates can be produced, all of which reduces the cost of production while providing a substrate of vastly improved quality over conventional substrates.

Another object of the present invention is to provide a method for the high production manufacture of substrates of the type described wherein the substrates can be formed, cleaned, coined, stacked and loaded onto trays in an automatic fashion, all of which can be done at high production speeds, at minimum cost and substantially with no operator attention except to provide stock material to the apparatus.

Other and further objects, features and advantages of the invention will become apparent as the following specification progresses, reference being had to the accompanying drawings for an illustration of the invention.

IN THE DRAWINGS:

FIG. 1a is a perspective, schematic view of the upstream stage of an apparatus for the high volume manufacture of substrates for use as parts of storage media, the view showing the way in which rolled stock material is first treated before the stock is blanked or stamped to form the disks which are used to form the substrates;

FIG. 1b is a view similar to FIG. 1a but showing the next stage of the apparatus, and illustrating the way in which the stamped disks are directed out of a blanking machine and through a mechanical cleaner;

FIG. 1c is another view of the apparatus for the present invention, showing the way in which the disks are moved through cleaning tanks before being sent to an embossing press for coining of the disks;

FIG. 1d is another view of the apparatus for the present invention, showing the way in which the disks are moved out of a cleaning tank in one section of a clean room and into a final clean room section where the disks are subjected to high mechanical pressures of the embossing press to coin the faces of the disks;

FIG. 1e is a view of the apparatus for the present invention, showing the way in which the coined disks leave the embossing press and are placed in trays for transit through an air lock separating the final clean room from the ambient atmosphere;

FIG. 2 is a top plan view of a section of the elongated stock material showing various stages of stamping the stock material to form the disks, the center hole for the disks, and the chamfers on the inner and outer peripheries of the disks;

FIG. 3 is a section through the stock material showing the various stages of the stamping of the disks therefrom;

FIG. 4 is an enlarged cross-sectional view of the stock material, showing the way in which chamfers are formed by dies on opposite sides of a disk;

FIG. 5 is a perspective view of a transfer device for feeding the disks into, through and out of the embossing press in which the disks are coined;

FIG. 6 is a section through the die of the embossing press, showing the way in which a disk is contained between the faces of the die for coining thereby;

FIG. 7 is a feed mechanism for stacking the coined disks from the transfer device of FIG. 5 into the grooves of a tray disposed on a conveyor.

FIG. 8 is a side elevation view of a disk with integral spacer rings thereon.

The apparatus for forming coined or cold forged substrates according to the method of the present invention for use as storage media is shown in FIGS. 1a–1e and is broadly denoted by the numeral 10. Apparatus 10 is adapted for forming substrates whose opposed faces are coined to present a high quality product substantially free of flaws associated with conventional substrates of storage media. The resulting storage medium formed with the substrate of this invention is of the type shown in FIG. 8 in which the faces of the substrate are coated with respective layers of a particular storage material and then used as a rigid disk, data storage medium. Typical coatings include magnetic and optical coatings to allow the storage medium to be used with magnetic and optical read-write heads for recording digital or analog data and other information, such as found in audio, video or computer applications.

Apparatus 10, at the upstream end thereof, includes a holder 12 for mounting a roll 14 of a suitable stock material, such as aluminum, for use in forming disks which are to become the substrates according to the method of the present invention. However, the stock material can be of any type which constitutes a malleable or coinable material or combination of materials, including clads and laminates. Typically, the stock material is in the form of a strip 16 of a standard width, such as from 7 to 9 inches. The strip is sufficiently flexible so that it can be bent and doubled upon itself so that it can be moved off and away from roll 14, past a guide post 18 and into and through a straightening machine 20 having a series of parallel rollers 22 which straighten the strip 16 so that it is generally coplanar between the side marginal edges thereof. The strip is then moved past a second guide post (not shown) and into and through a press 25 having a series of vertically aligned rollers 26. The strip passes between the center rollers 26 of the set to develop an ultra-precision thickness for the strip. Typically, the thickness of the stock strip is within a tolerance range of ±0.003 inch. After passing the press 25, strip 16 will have a thickness tolerance in the range of ±0.0001 inch. The purpose of this reduction in the tolerance is to have a precision volume of material presented by each disk to the coining or embossing press at a downstream location as hereinafter described. Without such precision volume in the disk, inconsistencies in dimensional and mechanical characteristics of the various disks could develop which would present problems encountered in the manufacture of conventional substrates.

After the strip 16 leaves press 25, it moves past a guide post (not shown) and into a blanking or stamping machine 30 in which a number of different stamping steps are performed. The stamping machine 30 can be conventional in construction and has a specific set of dies to perform the desired stamping steps. The end result of the stamping operation in the stamping machine 30 is a series of flat disks which have center holes and which are chamfered on the inner and outer peripheries thereof. A suitable stamping machine for this purpose is a 250 ton blanking machine made and sold by Minster Machine Company of Minster, Ohio. The machine includes a series of dies 32 only two of which are shown in FIG. 1b.

FIG. 2 shows a sequence in the stamping of a disk from strip 16 in machine 30. The first step occurs when strip 16 is stamped to form holes 34 in the strip. These holes are used for receiving guide pins which advance the strip through the machine to assure precision stamping of the disks from the strip. When holes 34 are formed, the disk 36 is also formed from the strip, the disk being integral with strip 16 only at webs 38. Also, a center hole 40 is formed by stamping in the strip to form the center hole for disk 36. FIG. 3 shows strip 16 as it corresponds to FIG. 2 in the stamping of the disk.

FIG. 2 further shows a disk 36 after it has been chamfered at the inner periphery and at the outer periphery thereof. The chamfering is achieved by the use of a pair of dies 42 and 44 (FIG. 4), the dies having circular projections 46 which are triangular in cross-section and which form chamfers 48 and 50 at the inner and outer peripheries of the disk 36. These chamfers are adjacent to chamfer rings 52 and 54. The next stamping operation shown in FIG. 2 is for the purpose of removing the chamfered ring 54. FIG. 3 shows the center hole 40 free of such ring 54.

The next stamping step occurs to separate the disk itself from the chamfered ring 52, such ring being held by webs 38 to strip 16. The strip can then be chopped into segments, such as along the line 45 (FIG. 2), to form scrap material which is taken out of the stamping machine by way of a conveyor 47 and directed into a bin 48. In such a case, the scrap material can be reused or sold as scrap.

The disks 36 resulting from the stamping operation are carried out of machine 30 by a conveyor 49 and directed into an abrasive or mechanical cleaner 50 where both faces of the disks are subjected to an abrasive or mechanical cleaning treatment to remove foreign material from the faces of the disks and to reduce oxide coatings, if any, on the disks. The disks 36 are then moved by conveyor 52 out of cleaner 50 and onto a conveyor system 54 where they are oriented in vertical planes. While in this vertical orientation, each disk becomes coupled to a moving hook 54 depending from the rail 55 of a transfer system 56, each hook having a lower end which is received in the center hole 40 of the corresponding disk 36, whereby the disk can be lifted and caused to move along the serpentine path of the rail 55.

Transfer system 56 delivers the disks 36 in a serial fashion to a cleaning tank 60 having a number of compartments 62, 64, 66 and 68, wherein different cleaning solutions are located to progressively clean the disks as they are lowered into each compartment, then lifted up and then lowered into the successive compartments. The cleaning solutions remove remaining foreign materials and oxides from the disks. After the disks are removed from tank 60, they pass through a dryer 70 where they are dried while they are still coupled to hooks 54. Then the disks are moved into a de-greasing tank 72 and then out of the de-greasing tank onto a transfer mechanism 74 where the disks are separated in a suitable fashion from hooks 54. The hooks then return to a location near conveyor 54 (FIG. 1b) to pick up and transfer additional disks 36.

As conveyor 56 extends away from dryer 70, the conveyor extends into one open rear side 71 (FIG. 1c) of a clean room section 73 defined by a top wall 75, a front wall 83 (FIG. 1d), a bottom wall 77 and a pair of spaced side walls 79. This clean room section is constructed so that air flows out of the region 73 through the open side 71, the air flow being denoted by the arrows 80. To this end, a blower 82 (FIG. 1d) is mounted on the upper wall 75 and blows air through plenums 77 and then into louvered passages 79 in front wall 83, whereby the air leaving the passages 79 is substantially laminar flow toward, into and through open end 71. Thus, the interior 73 of the clean room containing de-greasing tank 72 is substantially kept free from any foreign matter entering the clean room which would otherwise tend to enter the clean room by way of the open side 71.

The end wall 83 in which plenums 77 and passages 79 are located has a port 84 through which conveyor 74 extends. The conveyor includes a static platform 86 and a reciprocal disk-advancing or feed device 88 for supporting the disks 36 and for advancing them one by one into an embossing press 90 which contains the coining dies for coining the faces of the disks. Press 90 is in a final clean room section 92 which is enclosed by wall 83, top wall 94, end wall 96 (FIG. 1e) and bottom wall 98. The air flow through the final clean room section 92 is from the louvered passages 100 in top wall 94 and downwardly into a porous floor 102 and into a plenum chamber 104 for flow of the air to a recirculating plenum. The air flow is directed from a blower 106 into and through passages 100 and downwardly into and through floor 102.

Press 90 can be of any suitable construction. Typically, it can be one made by Minster Machine Company in Minster, Ohio and known as a 1500 ton knuckle joint embossing press. A machine of this type can deliver up to 100 strokes per minute.

The feed device 88 for advancing disks 36 into embossing press 90 is a ladder mechanism operable in cooperation with static platform 86, the platform having a plurality of posts or spindles 87 thereon, shown in Figs. 1d and 5. Device 88 includes a pair of spaced rails 90 and 92 which move axially and transversely of their longitudinal axes. Each rail has a plurality of fingers 94 thereon which engage the outer peripheries of the various disks 36 and clamp the disks between the rails. When the rails are lifted to separate the disks from posts 87, the rails are shifted axially to advance the disks incrementally, whereby the disks are advanced successively into and through the embossing press 90 where the disks are coined. The ladder mechanism is conventional in construction and is made by a number of different companies, including Minster Machine Company of Minster, Ohio.

The typical operation of the ladder mechanism includes the steps of moving the rails 90 and 92 inwardly relative to and toward each other so that the fingers 94 grip the opposed side marginal edge portions of the disks on first posts 87. Then, the rails are lifted a slight amount to lift the disks off the posts. Then the rails are advanced toward the machine 90 and through a distance sufficient to align each disk with the next adjacent, downstream post 87. Then the rails are lowered, thereby lowering the disks on vertically aligned posts therebeneath, following which the rails are moved away from each other, separating the fingers from contact with the respective disks. Then the rails are moved in the opposite direction to positions at which the fingers 94 are again aligned with the next adjacent disks 36. Then the process is repeated and proceeds at a rate correlated with the stroke rate of embossing press 90.

As each disk 36 is advanced, there is one disk 36 which is moved into the die zone 110 (FIG. 6) of embossing press 90. The press has dies 112 and 114 mounted on reciprocal shafts 116 and 118, the shafts having lower and upper ends, respectively, which are chamfered to effectively receive the chamfered center hole of each disk 36 aligned therewith. Dies 112 and 114 have die faces 120 and 122, respectively, for engaging the opposed faces of the disk 36. The die further has stop members 124 which limit the travel of the die 112 toward die 114.

The downward movement of die 112 is stopped by stop members 124 moving into engagement with each other. When this occurs, the die faces engage the faces of the disk 36, and the pressure exerted on the disk faces is of the order of 1500 tons, depending upon the size of the disk, causing a coining or cold flow of the material of the disk, while the inner and outer diameters of the disk are contained, rendering the faces of the disk extremely smooth, flat and in parallelism with each other. Embossing press 90 operates at a rate of approximately 100 strokes per minute; thus, the transfer device 88 defined by the ladder mechanism 90 operates at this same speed or faster.

After each disk 36 is subjected to the contained, massive pressures of dies 112 and 114, the disk is moved progressively toward an exit port 130 in a side wall 131 of embossing press 90. The transfer device 88 advances each coined disk 36 to a tray loading mechanism 132 for loading the coined disks in trays 134 at a location adjacent to the side wall 131 of embossing press 90 near exit port 130 thereof. The trays are directed into a final clean room through an air lock 136 (FIG. 1e) by a conveyor 138 which carries the tray, with a lid 140 thereon, into a machine 142 within clean room section 92 which removes the lid from the tray and uses that particular lid for covering a full tray of coined disks on a second conveyor 144 which extends toward and through air lock 136.

Each tray 134 has grooves 150 therein for receiving and supporting a stack of coined disks 36 arranged in vertical planes as shown by stack 152 (FIG. 7). Typically, there are 25 to 50 such disks 36 in a tray 134. The incoming, empty trays 134 are directed to a first station adjacent to a loading mechanism 132, whereupon a transfer member 154, which can be electrically, hydraulically or pneumatically actuated, pushes an empty tray 134 into a position beneath and adjacent to loading mechanism 132. Thus, an empty tray will be in position to receive coined disks one by one in the slots or grooves 150 of the tray aligned with and beneath mechanism 132.

Mechanism 132 includes a box-like housing 161 (FIG. 7) having a pair of opposed, parallel sides 156 mounted on a shaft 158 for rotation in the direction of arrows 160. The housing has four sliding end walls 162 shiftably mounted on sides 156, each end wall 162 having an expandable mandrel 164 thereon which is expanded by a mechanism (not shown) within housing 161 to grip and hold a coined disk 36 as housing 161 is rotated in a clockwise direction when viewing FIG. 7 through an arc of approximately 90°. When the housing has rotated through such an angle, the corresponding vertical end wall 162 having a coined disk on its mandrel is allowed to move downwardly under the influence of another means (not shown) within housing 161. This downward movement occurs until the coined disk is inserted in a corresponding groove 150 of the corresponding tray 134, whereupon the mandrel is contracted and the conveyor 144 is advanced in a direction of arrow 147 (FIG. 7) through a slight distance until the next groove 150 is aligned with the downward path of travel of the next coined disk 36. Then, before housing 161 is rotated again, the downwardly extending end wall 162 is elevated, following which the housing 161 is rotated once again, all of which occurs or will occur after transfer device 88 has deposited a disk 36 on the mandrel 164 of the topmost end wall 162.

The process continues until a tray 134 has been filled and the tray has moved out from beneath housing 161. Transfer member 154 is then energized to push the next available empty tray 134 into a position beneath and vertically aligned with the housing 161. The full tray moves away from loading mechanism 88 and into and through the machine 142, where it receives a lid 140 taken from an empty tray traveling in the opposite direction toward zone 135. The machine 142 can be of any suitable construction, such as a vacuum lift including a piston and cylinder assembly 149 and a control mechanism (not shown) for actuating assembly 149 to lift off, by suction or otherwise, the lid 140 from an incoming tray and placing the lid on an outgoing, full tray.

Conveyors 138 and 144 work intermittently and extend through the air lock 136. The air lock has an entry gate 163 and an exit gate 165 with reference to the direction of movement of the incoming empty trays. The gates are operated by fluid piston and cylinder assemblies 167 and 169 operated by control means (not shown) which are pre-programmed in accordance with the rate of coining of embossing press 90 and the incremental advancement of conveyors 138 and 144.

After the full trays have been passed out of the apparatus through airlock 136, the coined substrate disks in the full trays are not exposed in any way to the ambient atmosphere. They are taken to a job site and into clean rooms for receiving coatings on the disks to form the storage media for which the substrates are designed.

FIG. 8 shows a completed disk with a layer 170 of material thereon, such material being sufficient to provide a storage capability for the disk. For purposes of illustration, the coating is a magnetic coating which is applied in any conventional manner. The coat material could also be suitable for optical recording as well as audio, video and computer recording.

In operation, apparatus 10 is first provided with a roll 14 of material, such as aluminum or aluminum alloy, in strip form. The strip 16 is then initially fed into the straightener machine 20, then through the press machine 25 where the thickness of the strip 16 is controlled within a tolerance range of ±0.0001 inch. The strip is then fed through the blanking machine 30 in which the individual disks 36 are formed, the scrap from the blanking or stamping operation being directed into a bin 48 for reuse or for sale.

The disks 36 are then moved into and through the cleaning machine 50, then out of the machine and into coupled relationship with hooks 54 on conveyor 56. The disks are then directed into the various compartments of cleaning tank 60, then out of the tank, through dryer 70, and then into de-greasing tank 72 for the purpose of cleaning the disks prior to their being coined in embossing press 90.

The disks are then separated from hooks 54 and then become coupled to the transfer device 88 for transit successively into, through and out of embossing press 90 in which the disks are coined. FIG. 6 illustrates the way in which the dies 112 and 114 are shifted relative to each other and into engagement with the opposed faces of the disks 36 to coin them. The pressure exerted by press 90 is of the order of 1500 tons, depending upon the size of the disk, to effect a flow of the material on the faces thereof so that the faces become extremely smooth, flat and parallel with each other, free of flaws and ready to be coated with a material for making the disks substrates of high quality for use in making rigid storage media.

As soon as the disks are coined, they are moved out of press 90 by transfer mechanism 88 and become coupled with transfer mechanism 132 so that the coined disks are fed one by one into a tray 134 below mechanism 132 and movable by conveyors 138 and 144. The coined disks eventually fill each tray and the full trays are moved incrementally by conveyor 144 through machine 142 where the full tray receives a lid and then is moved out of the final clean room 92 through an air lock 136 and then to a location at which the encased coined disks are stored or put into actual use.

The present invention provides for the economical and high yield manufacture of high quality substrates for use as data storage media by coining. The invention further includes a method for making the substrate. The substrates made in accordance with the teachings of the present invention have uniform part-to-part dimensions and consistent geometries, including uniformity of surface texture, parallelism of the faces of the substrate and flatness of such faces. The substrates according to the method of the present invention are virtually free of all flaws typically found in substrates produced by diamond-turning and abrasive machining. Thus, the substrate according to the method of the present invention improves both product quality and thereby minimizes the amount and degree of inspection tests following manufacture. The substrate according to the method of the present invention can also be provided with any desired surface finish, texture, lay or form. This feature could include but is not limited to cross-hatch, radial, circumferential and random lays. This is achieved by selecting the desired finish, texture, lay or form of the die faces which contact the faces of each disk 36 in the manner shown in FIG. 6.

The substrate according to the method of the present invention eliminates the problem of asymmetrical stresses associated with other substrate fabrication techniques. The substrate of the present invention is symmetrical throughout its entirety, is symmetrically pre-stressed, and is stronger and more dimensionally stable and has greater structural integrity than those conventionally machined from solid parts. The substrate according to the method of the present invention further exhibits sub-micron flatness and smoothness and has exceptional axial acceleration characteristics in dynamic functions.

The substrate according to the method of the present invention can be produced from high purity, corrosion-resistant aluminum materials (al-clad) that are not adaptable to conventional fabrication techniques such as cutting or abrasive machining techniques. Moreover, the substrate according to the method of the present invention is made such that it needs only a minimum amount of nickel undercoating currently required in post-processing of conventional substrates. The substrate of the present invention can be thinner than conventionally produced substrates and still be a high quality product.

The substrate according to the method of the present invention can be produced at much greater production rates per manufacturing station than conventionally produced substrates. At their maximum yield rates, conventional techniques provide for maximum production rates at best of no more than 100 to 125 substrates per hour. In contrast, the method of present invention, when in operation, can produce as many as 4800 to 6000 substrates per hour so as to have a throughput over 40 times as fast as conventional techniques. Moreover, the method of present invention provides higher manufacturing yields than is capable with conventional techniques of producing substrates.

The substrate made in accordance with the present invention improves yields in post-processing media applications and in disk drive assembly and qualification.

The coined substrate according to the method of the present invention minimizes the effect of impurities of the malleable material on surface finish and product functionality. Less scrap material is generated and fewer production and inspection operations are necessary in the manufacture and quality control of the substrate according to the method of the present invention.

The substrate according to the method of this invention can be fabricated with special features, such as index and timing marks and integral spacer rings 170 (FIG. 8) which simplify the disk drive assembly process by reducing the number of parts and part interfaces, thereby minimizing tolerance build up. The substrate according to the method of this invention can use a number of different preforms including blanked, forged, extruded, sintered and rolled material forms. The substrate can be fabricated by the use of compensated dies that account for the expansion characteristics of given materials. The substrate can be fabricated with precision chamfers and other unique features, including tapered substrates for low inertia systems.

What is claimed is:

1. A method for forming a substrate to be used as a rigid disk storage medium comprising:

coining a blank of a malleable, non-magnetic metal to cause flow of the material of the blank on the surface of the blank by employing a pair of dies having flat surfaces faced with the blank, the coining step being performed as the blank is fixed by a shaft and within a stop member to regulate spreading of the material of the blank, whereby a super precise smooth surface is formed.

2. A method for forming a substrate for use as part of a rigid disk storage medium comprising:

providing a blank of a malleable and non-magnetic metal;

cleaning the blank to remove foreign matter therefrom; and coining the blank to cause flow of the material of the blank on the faces of the blank by employing a set of dies having a flat surface to face the blank which is fixed by a shaft and in stop members to regulate spreading of the material of the blank in order to get a super precise smooth surface.

3. A method as set forth in claim 2, wherein the blank is corrosion-resistant aluminum alloy.

4. A method as set forth in claim 2, wherein the blank is high purity aluminum not adaptable for diamond-turning treatment.

5. A method as set forth in claim 2, wherein the blank is a clad material which is clad with a nickel or chromium layer as an undercoating applied by a chemical or physical plating.

6. A method as set forth in claim 2, wherein the coining step includes coining by using at least one of dies having a texture selected from the group of line-lays including cross-hatch, radial, circumferential and random lays (both the width and the depth of the lines are in order of sub-micron) on the facing surface to the blank to provide the texture on the surface of the blank by the press in the coining.

* * * * *